United States Patent [19]
Appleford et al.

[11] Patent Number: 5,727,373
[45] Date of Patent: Mar. 17, 1998

[54] APPARATUS AND METHOD FOR UNWRAPPING FIBRE OPTIC CABLE FROM AN OVERHEAD LINE

[75] Inventors: David Dale Appleford, Swindon; James Charles Baker, Buford, both of Great Britain

[73] Assignee: Focas Limited, Wiltshire, United Kingdom

[21] Appl. No.: 640,867

[22] PCT Filed: Nov. 11, 1994

[86] PCT No.: PCT/GB94/02478

§ 371 Date: Jun. 28, 1996

§ 102(e) Date: Jun. 28, 1996

[87] PCT Pub. No.: WO94/13619

PCT Pub. Date: May 18, 1995

[30] Foreign Application Priority Data

Nov. 12, 1993 [GB] United Kingdom ............... 9323384

[51] Int. Cl.⁶ .................. A01D 75/30; A01D 45/02
[52] U.S. Cl. .................. 57/1 UN; 57/67; 57/115; 57/116; 242/386
[58] Field of Search ............... 57/1 UN, 67, 115, 57/116; 242/444.4, 386

[56] References Cited

U.S. PATENT DOCUMENTS

| | | |
|---|---|---|
| 3,866,403 | 2/1975 | Zimmermann ............... 57/1 UN |
| 4,584,829 | 4/1986 | Heinke ............... 57/1 UN |
| 4,871,127 | 10/1989 | Clark ............... 242/386 |
| 5,109,658 | 5/1992 | Garner ............... 57/2.5 |
| 5,517,812 | 5/1996 | Simmons ............... 57/18 |

FOREIGN PATENT DOCUMENTS

| | | |
|---|---|---|
| 1 640 680 | 2/1971 | Germany . |
| 62-140980 | 6/1987 | Japan ............... 242/441.4 |
| 2047281 | 11/1980 | United Kingdom ............... 57/115 |
| 2 104 474 | 3/1983 | United Kingdom . |
| 2 173 471 | 10/1986 | United Kingdom . |

*Primary Examiner*—William Stryjewski
*Attorney, Agent, or Firm*—Westman, Champlin & Kelly, P.A.

[57] ABSTRACT

The present invention relates to an apparatus for unwrapping fiber optic cable (B) from an overhead line (A). The apparatus comprises a carriage (1) which sits on the overhead line (A) and is moveable along the overhead line (A) and a guide arm (2) mounted for rotation about the carriage (1). The guide arm (2) performs the unwrapping action of the fiber optic cable (B) from the overhead line (A). There is also a drum (3) and drum drive means (5), the drum (3) gathering the fiber optic cable (B) which has been unwrapped from the overhead line (A). There are also a device (6) for varying the speed of rotation of the guide arm (2) with respect to the forward speed of the carriage (1).

14 Claims, 3 Drawing Sheets

APPARATUS AND METHOD FOR UNWRAPPING FIBRE OPTIC CABLE FROM AN OVERHEAD LINE

BACKGROUND OF THE INVENTION

The present invention relates to an apparatus and method for unwrapping fibre optic cable from an overhead line. The term "overhead line" is intended to be a general reference to phase and earth conductors of overhead power lines and messenger cables strung between power lines and other such lines which pass overhead.

Fibre optic cables are now a well known and developed art and are increasingly replacing older forms of cabling in the field of communication.

Fibre optic cables can be employed to provide communication links based on power distribution networks. Conveniently, the fibre optic cable is wound directly onto the already established overhead lines, thus utilising the networks which already exist thereby linking control centres and sub-stations, etc.

It is already known to use a suitable apparatus which can move along an overhead line and simultaneously wrap the fibre optic cable around the overhead line. However, there is now a demand for an apparatus which is capable of unwrapping the fibre optic cable from overhead lines. For example, the user of a fibre optic cable communications network may wish to upgrade the system with a fibre optic cable of superior quality or damage may have occurred to existing fibre optic cable, thereby necessitating repair work to be carried out.

Unfortunately, whilst a fibre optic cable wrapping apparatus can simply apply the cable to an overhead line at constant pitch, a fibre optic cable unwrapping apparatus must provide for variations which occur in the pitch of the wrapped cable. For example, when the fibre optic cable is installed, there may be some slippage of the wrapping apparatus, particularly if there is ice present on the overhead line or if the wrapping apparatus has to move steeply uphill or downhill at the extremeties of the span of the overhead line between adjacent poles or towers. In addition, loops of fibre optic cable can form simply because the fibre optic cable was not wound onto the overhead line at the correct tension.

Clearly, it would not, therefore, be appropriate to simply reverse the action of a fibre optic cable wrapping apparatus which would not provide for any variation in pitch of the wrapped cable.

SUMMARY OF THE INVENTION

According to the present invention, there is provided an apparatus for unwrapping fibre optic cable from an overhead line comprising a carriage which sits on the overhead line and is moveable along the overhead line, a guide arm mounted for rotation about the carriage, the guide arm performing the unwrapping action of the fibre optic cable from the overhead line, a drum and drum drive means, the drum gathering the fibre optic cable which has been unwrapped from the overhead line wherein the apparatus further comprises means for varying the speed of rotation of the guide arm with respect to the forward speed of the carriage.

Preferably, the means for varying the speed of rotation of the guide arm comprise a sensor to sense the forward speed of the carriage and maintain the ratio $$R = \frac{\text{speed of rotation of guide arm}}{\text{forward speed of carriage}}$$

Preferably, the guide arm and the carriage are connected by a gearing mechanism.

Preferably, the sensor is a speed encoder which provides a feedback signal to maintain the ratio R.

Preferably, the drum is provided with a slipping clutch to ensure that the tension in the fibre optic cable being unwrapped does not exceed a predetermined limit.

Preferably, the carriage is driven along the overhead line by a motor.

Preferably, an angle sensor is provided to sense the angle of the fibre optic cable at the point of leaving the overhead line and to adjust the ratio R thereby providing for variations in the pitch of the fibre optic cable being unwrapped from the overhead line.

Preferably, the angle sensor comprises a biased means which is deflected by the fibre optic cable from a first position to a second position in dependence on the angle at which the fibre optic cable leaves the overhead line.

Preferably, the drum is coaxially mounted on the carriage.

Preferably, the guide arm is coaxially mounted on the carriage and is provided with guide arm drive means.

Preferably, the guide arm is mounted on one end of an arm with a counterbalance at the other end of the arm, the arm being rotatable about the carriage.

Preferably, the present invention also provides a method for unwrapping fibre optic cable from an overhead line comprising the seeps of mounting an unwrapping apparatus on an overhead line and continuously adjusting the unwrapping rotational speed with respect to the forward speed of the apparatus to provide for variations in the forward speed of the apparatus as it moves along the overhead line.

Preferably, the method further comprises the steps of sensing the pitch of the fibre optic cable at the point at which it leaves the overhead line and continuously adjusting the unwrapping rotational speed with respect to the forward speed of the apparatus to provide for variations in the pitch of the fibre optic cable.

DESCRIPTION OF THE PREFERRED EMBODIMENTS

The fibre optic cable unwrapping apparatus is similar in some respects to a fibre optic cable wrapping apparatus. However, in a fibre optic cable wrapping apparatus, the fibre optic cable is applied at a constant pitch because the wrapping action is geared in a fixed manner to the forward speed of the machine.

Figure 1:
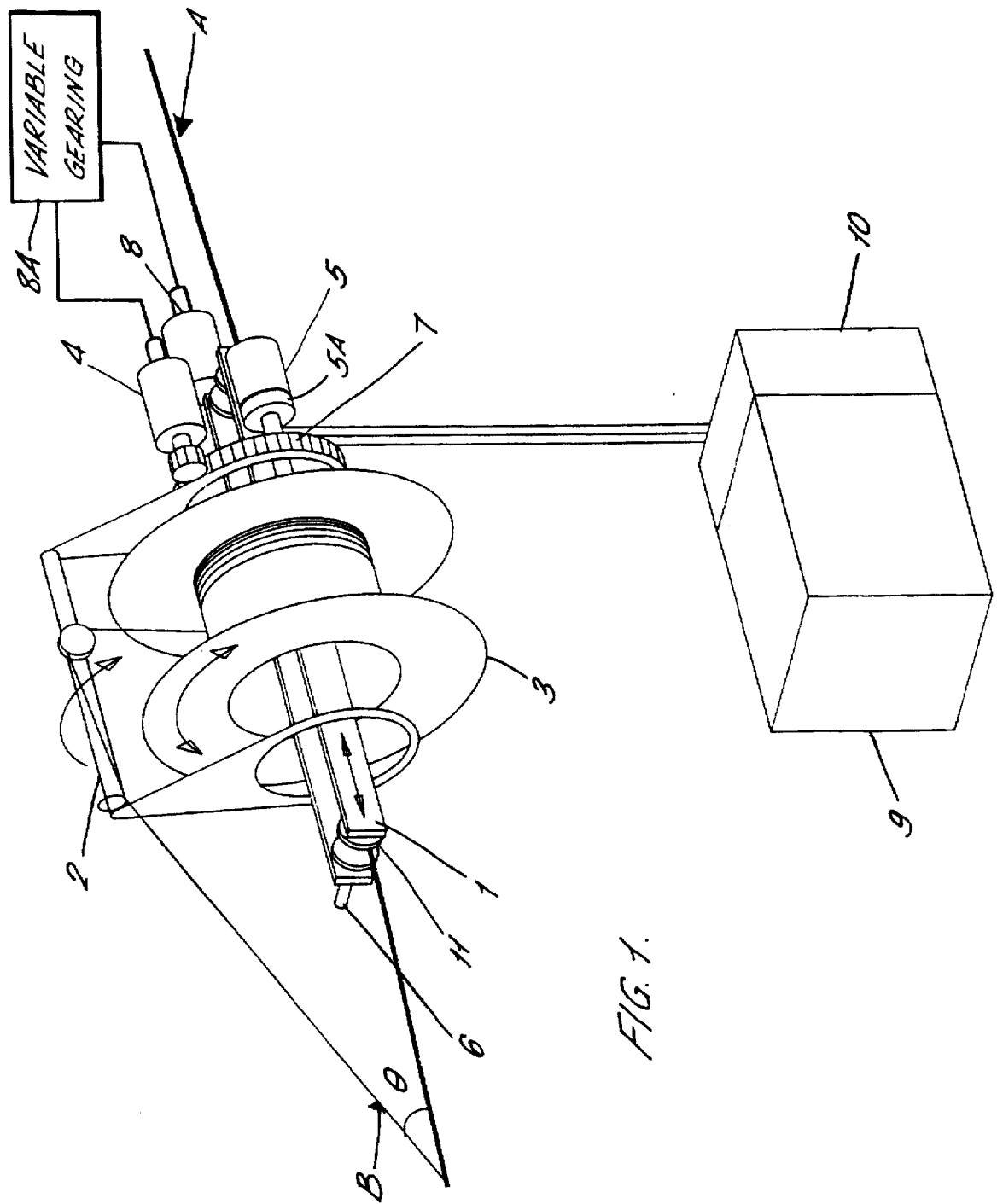
FIG. 1 depicts a fibre optic cable unwrapping apparatus according to a preferred embodiment of the present invention.

FIG. 1 depicts a preferred embodiment of a fibre optic cable unwrapping apparatus comprising a carriage 1 which sits on an overhead line A and is moveable along the overhead line A. A guide arm 2 mounted for rotation about the carriage 1 and therefore, the overhead line A. The guide arm performs the unwrapping action of the fibre optic cable B from the overhead line A. There is also a drum 3 which rotates coaxially about the carriage 1 to take up the fibre optical cable B which has been unwrapped from the overhead line A. Clearly, the drum 3 need not be mounted coaxially about the carriage, the requirement being only that it is capable of gathering the unwrapped fibre optic cable B. There is a motor 4 which drives the guide arm 2 and a motor 5 which drives the drum 3 through a slipping clutch 5A as shown schematically.

By way of comparision, a fibre optic cable wrapping apparatus would also consist of a carriage, a guide arm and a drum but the drum is typically mounted on one end of an arm which rotates about the overhead line. A counterbalance is then provided on the other end of the apparatus to ensure the correct balance is maintained during rotation. The counterbalance can "track" inwardly as the fibre optic cable is removed from the drum thereby maintaining the correct balance for any weight of fibre optic cable remaining on the drum.

The fibre optic cable unwrapping apparatus further comprises means for varying the speed of rotation of the guide arm 2 with respect to the forward speed of carriage 1. The apparatus is, therefore, able to accommodate any change in the forward motion of the carriage. For example the "looping" of overhead lines between adjacent poles, or towers means that the unwrapping apparatus will accelerate downhill when leaving a pole and will decelerate uphill when approaching the next pole The unwrapping action must, therefore, increase in speed intially, level out at the bottom of the loop and then decrease in speed on the approach to the next pole. When the pitch of the wrapped cable is constant, the requirement will be to maintain a constant ratio R.

A fibre optic cable unwrapping apparatus must be able to accommodate both variations in the forward speed of the carriage 1 and also variations in the pitch of the wrapped fibre optic cable B.

The ratio R is important where $$R = \frac{\text{speed of rotation of guide arm}}{\text{forward speed of carriage}}$$

When the pitch of the fibre optic cable is constant, R should be maintained at a constant value. In general, adjustment of the speed of rotation of the guide arm 2 will only be necessary when the forward speed of the carriage 1 increases or decreases when leaving a pole and approaching the next pole.

When the pitch of the fibre optic cable varies, as described earlier, it must be possible to adjust the value of R so that the speed of rotation of the guide arm 2 must be adjustable independently of the forward speed of the carriage 1.

Figure 2:
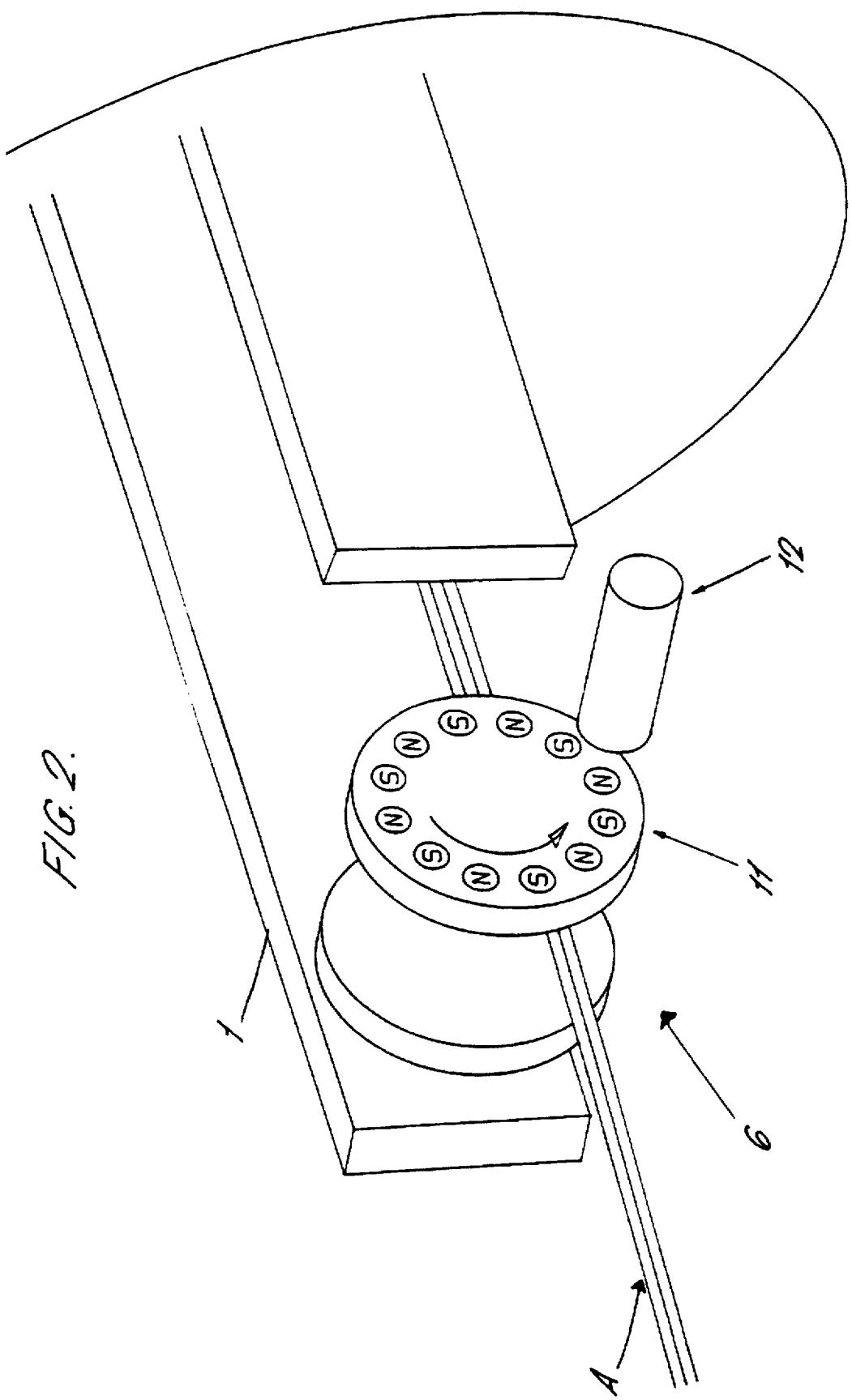
FIG. 2 depicts a suitable speed encoder for use in the apparatus in FIG. 1.

The means for varying the speed of rotation of the guide arm 2 preferably comprises a speed encoder 6 of the type depicted in FIG. 2. The speed encoder 6 in enlarged detail in FIG. 2 comprises alternating button magnets N,S,N . . . . which are equispaced around the circumference of one of the rollers 11 which enable the carriage 1 to move along the overhead line A.

A reed switch 12 is fixed to the carriage 1 and senses the N,S,N,S . . . sequence and, therefore the forward speed of the carriage 1. The speed encoder 6 can be controlled manually from ground level by radio control or can be set automatically to adjust or maintain the magnitude of the ratio R as required.

Figure 3:
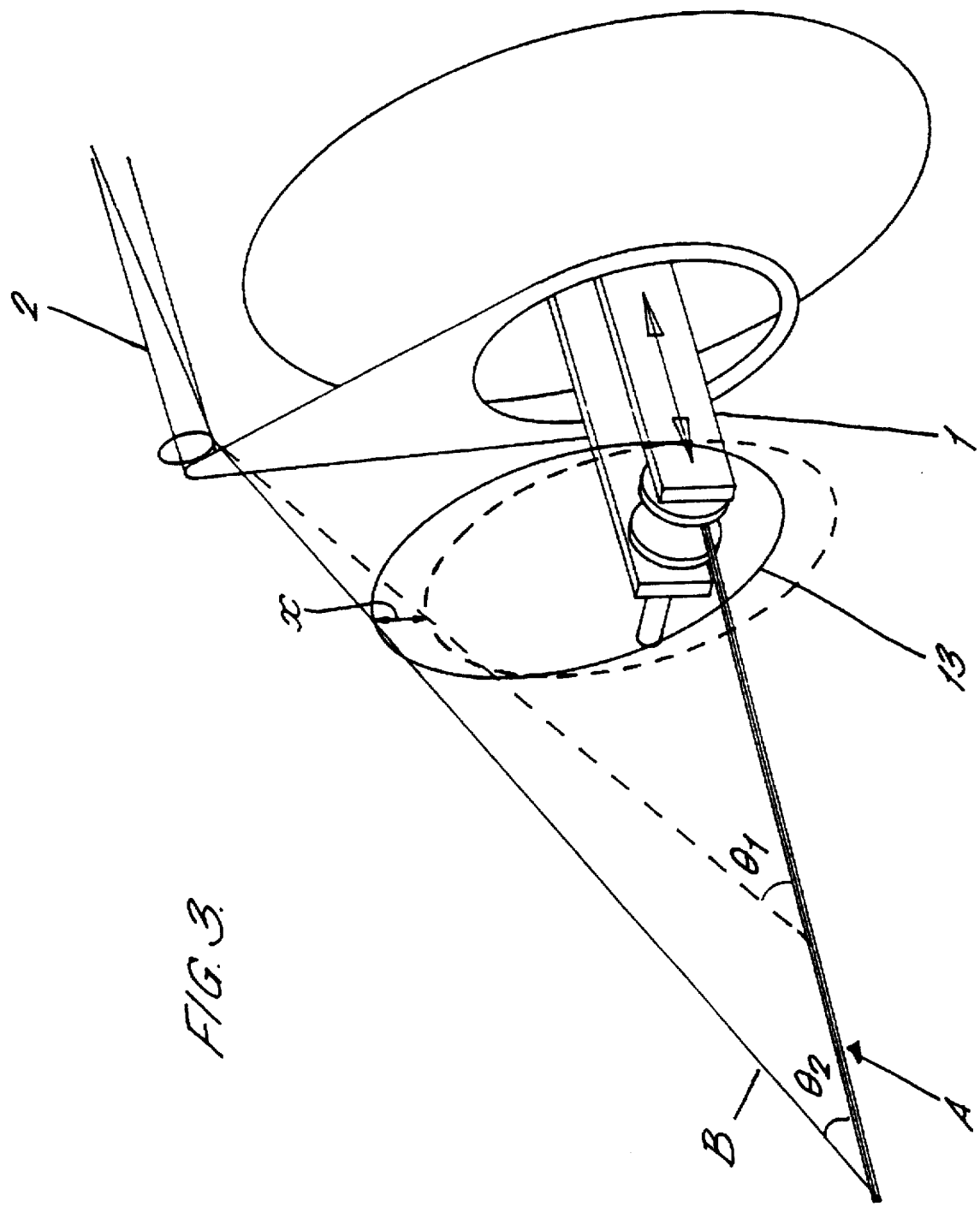
FIG. 3 depicts a suitable angle sensor for use in the apparatus in FIG. 1.

It is also important to determine the pitch of the fibre optic cable B being unwrapped from the overhead line A and therefore, an angle sensor is preferably provided on the fibre optic cable B at the point at which it leaves the overhead line A. A typical angle sensor 13 is depicted in enlarged detail in FIG. 3. The angle sensor comprises a curved saddle ring 13 which is spring loaded or biased in another suitable manner and located such that it receives a deflection from the fibre optic cable B. As the pitch of the cable B increases, angle $\theta$ increases from $°2$ to $°1$ and the ring 13 will be deflected by a distance X. A deflection of ring 13 outside set limits can be sensed by appropriate electronics, for example, the closure of a pair of simple electrical contacts acting as limit switches. The value of ratio R can then be adjusted appropriately. Alternatively, the deflection of ring 13 could be measured using a standard displacement transducer. It is also possible to rely on a manual adjustment for ratio R which is desirable in the event that the automatic adjustment should malfunction.

If the angle $\theta$ between the overhead line A and the fibre optic cable B is large, indicating a short pitch, the speed of rotation of the guide arm 2 increases to unwrap more cable for a given distance moved forward by the carriage 1. If the angle $\theta$ is small, indicating a long pitch or indeed, a stretch of cable which is in a loop, the speed of rotation of the guide arm 2 will decrease to unwrap less cable for a given distance moved forward by the carriage 1. In the case of a loop, the carriage 1 can simply proceed forward whilst the rotation of the guide arm 2 ceases. Clearly, in the case of varying pitch of the wrapped cable, it must be possible to vary the ratio R.

Preferably, the carriage 1 is driven along the overhead line A by a motor 8 although this is not necessary since the apparatus could be pulled along via a rope from ground level. There is a battery pack 9 for supplying motors 4, 5 and 8 with the required power. The radio control 10 which enables manual adjustment of the ratio R could be located adjacent the battery 9 or separately as required.

The drum 3 should preferably be provided with the slipping clutch (not shown) in order to ensure that the tension in the fibre optic cable B being unwrapped does not exceed a predetermined limit—typically 10–20 N. The speed of rotation of the drum 3 should preferably be such that the rate of take-up of the cable B exceeds the maximum forward speed of the carriage 1. Furthermore, it is advantageous to mount the drum 3 such that it is coaxial with the overhead line A to avoid the use of a counterbalance (as in a wrapping machine). The coaxial drum 3 will ensure that the machine remains perfectly balanced at all times as the fibre optic cable B is gathered from the overhead line A.

In a preferred embodiment, the guide arm could be mounted on one end of an arm with a counterbalance at the other end of the arm. With this arrangement, it would not be necessary to provide any form drive means, e.g a motor for the guide arm 2. The guide arm 2 would be free to rotate around the overhead line A, the rotation being generated by the tension in the cable B being wrapped onto the drum 3.

It is also envisaged that the tension in the cable B may be sufficient to pull the apparatus along the overhead line A thus avoiding the need for a motor 8 as depicted in FIG. 1.

The guide arm and the carriage are connected by a variable gear mechanism 8A. The apparatus should be capable of moving backwards as well as forwards along the overhead line A in order to accommodate any obstructions encountered on the overhead line A during the unwrapping process. Similarly, the guide arm direction of rotation should be reversible to provide for the situation where the fibre optic cable becomes entangled. The cable can then be disentangled under manual control from the ground.

Clearly, the unwrapping apparatus and method described herein will allow for the many variations and problems encountered in the unwrapping process for fibre optic cable which have previously not been addressed.

We claim:

1. An apparatus for unwrapping fibre optic cable from an overhead line comprising a carriage which sits on the overhead line and is moveable along the overhead line, a guide arm mounted for rotation about the carriage, the guide arm performing the unwrapping action of the fibre optic cable from the overhead line, a drum and drum drive means, the drum being driven by the drive means to gather the fibre optic cable which has been unwrapped by the guide arm from the overhead line wherein the apparatus further comprises means for varying the speed of rotation of the guide arm with respect to the forward speed of the carriage.

2. An apparatus as claimed in claim 1, wherein the means for varying the speed of rotation of the guide arm comprises a sensor to sense the forward speed of the carriage and maintain a desired ratio R, where R equals the speed of rotation of the guide arm divided by the forward speed of the carriage.

3. An apparatus as claimed in claim 2, wherein the guide arm and the carriage are connected by a variable gearing mechanism.

4. An apparatus as claimed in claim 2, wherein the sensor is a speed encoder which provides a feedback signal to maintain the ratio R.

5. An apparatus as claimed in claim 2, wherein the ratio R can either be maintained at a constant value or adjusted.

6. An apparatus as claimed in claim 2, wherein the drum is provided with a slipping clutch to ensure that the tension in the fibre optic cable being unwrapped does not exceed a predetermined limit.

7. An apparatus as claimed in claim 1, wherein the carriage is driven along the overhead line by a motor.

8. An apparatus as claimed in any preceding claim 2, wherein an angle sensor is provided to sense the angle of the fibre optic cable at the point of leaving the overhead line and adjust the ratio R, thereby providing for variations in the pitch of the fibre optic cable being unwrapped from the overhead line.

9. An apparatus as claimed in claim 8, wherein the angle sensor comprises a biased means which is deflected by the fibre optic cable from a first position to a second position in dependence on the angle at which the fibre optic cable leaves the overhead line.

10. An apparatus as claimed in claim 1, wherein the drum is coaxially mounted on the carriage.

11. An apparatus as claimed in claim 1, wherein the guide arm is coaxially mounted on the carriage and said means for varying the speed of rotation of the guide arm comprises guide arm drive means.

12. An apparatus as claimed in claim 1, wherein the guide arm is mounted on one end of an arm with a counterbalance at the other end of the arm, the arm being rotatable about the carriage.

13. A method for unwrapping fibre optic cable from an overhead line comprising the steps of mounting an unwrapping apparatus having a carriage on an overhead line, moving the carriage along the overhead line, rotating a guide arm mounted on the carriage about the carriage to unwrap the fibre optic cable from the overhead line, gathering the unwrapped fibre optic cable on a drum mounted on the carriage, and continuously adjusting the unwrapping rotational speed of the guide arm with respect to the forward speed of the carriage to provide for variations in the pitch of the fibre optic cable being unwrapped from the overhead line.

14. A method as claimed in claim 13, further comprising the steps of sensing the pitch of the fibre optic cable at the point at which it leaves the overhead line.

* * * * *